(12) United States Patent
Pickett et al.

(10) Patent No.: US 9,462,666 B2
(45) Date of Patent: Oct. 4, 2016

(54) ELECTRODELESS FLUORESCENT BALLAST DRIVING CIRCUIT AND RESONANCE CIRCUIT WITH ADDED FILTRATION AND PROTECTION

(71) Applicant: Environmental Potentials, Pasadena, CA (US)

(72) Inventors: Andrew C Pickett, Pasadena, CA (US); Naveen R Tera, Sandy, UT (US); Robert V Rawlings, Sandy, UT (US)

(73) Assignee: ENVIRONMENTAL POTENTIALS, Pasadena, CA (US)

( * ) Notice: Subject to any disclaimer, the term of this patent is extended or adjusted under 35 U.S.C. 154(b) by 0 days.

(21) Appl. No.: 14/828,815

(22) Filed: Aug. 18, 2015

(65) Prior Publication Data
US 2016/0057843 A1 Feb. 25, 2016

Related U.S. Application Data

(60) Provisional application No. 62/039,372, filed on Aug. 19, 2014.

(51) Int. Cl.
| | |
|---|---|
| H05B 37/00 | (2006.01) |
| H05B 39/00 | (2006.01) |
| H05B 41/14 | (2006.01) |
| H05B 41/282 | (2006.01) |
| H05B 41/38 | (2006.01) |

(52) U.S. Cl.
CPC ............ *H05B 41/282* (2013.01); *H05B 41/38* (2013.01)

(58) Field of Classification Search
None
See application file for complete search history.

(56) References Cited

U.S. PATENT DOCUMENTS

| | | | | |
|---|---|---|---|---|
| 5,767,631 | A * | 6/1998 | Konopka et al. | 315/307 |
| 6,441,652 | B1 * | 8/2002 | Qian | 327/108 |
| 6,486,570 | B1 * | 11/2002 | Price et al. | 307/105 |
| 2004/0007986 | A1 * | 1/2004 | Parra et al. | 315/169.1 |
| 2014/0145620 | A1 * | 5/2014 | Goscha et al. | 315/85 |

* cited by examiner

*Primary Examiner* — Anh Tran
(74) *Attorney, Agent, or Firm* — Buchalter Nemer

(57) ABSTRACT

A ballast circuit for a lighting system using an induction fluorescent lamp utilizes an AC-DC rectification circuit, a DC-DC boost power conversion circuit, a DC-AC half bridge inverter circuit, and a resonating circuit to ignite the lamp and maintain substantially constant power output of the lamp, while the DC-AC half bridge inverter circuit is further comprised of a gate isolation transformer connected in a half bridge inverter schematic which uses a ballast integrated circuit (IC) to drive a high side MOSFET and a low side MOSFET and the gate isolation transformer electrically isolates a gate signal to the high side MOSFET.

9 Claims, 11 Drawing Sheets

ELECTRODELESS FLUORESCENT BALLAST DRIVING CIRCUIT AND RESONANCE CIRCUIT WITH ADDED FILTRATION AND PROTECTION

CROSS REFERENCE TO RELATED APPLICATIONS

This application is a non-provisional application which claims priority from U.S. Ser. No. 62/039,372, filed Aug. 19, 2014, the disclosure of which is specifically incorporated by reference herein.

TECHNICAL FIELD OF THE INVENTION

This invention relates to lighting of electrodeless/induction fluorescent lamps.

BACKGROUND

Fluorescent lamps have been widely used in industry in recent years due to their higher efficiency and longer life than electric bulbs. While conventional fluorescent lamps have electrodes, induction fluorescent lamps do not use any electrodes for their operation. A lighting system using an induction fluorescent lamp consists of an inductively coupled electrodeless fluorescent lamp along with its driving ballast. The principal of electromagnetic induction is employed in the lamp system to ignite the plasma, making the plasma to emit light on the fluorescent walls of the tube. Since the lamp system does not contain any electrodes, the life of electrodeless lamp is significantly higher than typical fluorescent lamps. The nature of these lamps is that they require higher ignition frequency to ignite and higher operating frequency to maintain constant light output. These frequencies are in radio frequency range. While self-oscillating resonating circuits are often used in these ballasts, they are not power factor corrected or efficient. Self-oscillating circuits are very sensitive to variations in the components and they are not very well suited for high temperature applications. Due to the features of low maintenance and higher life time, electrodeless lamps are often installed in high bays, tunnels, high ceilings and other locations where air circulation and ventilation is very minimal and, due to this, the lamps and ballasts are subjected to extreme high temperature conditions. Poor fixture design also adds more heat to the lamp-ballast system. Extreme heat conditions due to environmental use factors will vary the lamp and ballast parameters, such as lamp inductance and ballast operational characteristics. Therefore, it is extremely important to have a lamp-ballast system that can withstand higher temperatures, while maintaining its good power quality.

SUMMARY OF THE INVENTION

The present invention is generally directed to ways to improve a ballast circuit used with an electrodeless induction fluorescent bulb.

This invention relates to an operating circuit for an electrodeless induction fluorescent lamp. The electronic ballast for an electrodeless induction lamp consists of AC-DC rectification, power factor correction while the rectified DC is boosted, DC-AC inversion using half bridge structured MOSFETs, ballast resonating circuit to ignite the lamp and to maintain the lamp output, and common mode and differential mode filter for this circuit. Electrodeless induction fluorescent lamps are unique in their nature, and they require much higher frequency of operation compared to traditional fluorescent lamps. While some of the electrodeless ballasts run at 1.25 MHz and 235 kHz, running frequency of 200 kHz is measured to be optimum for selection of resonating inductor and capacitor, to maintain continuous operation and restrike in the event of high ambient temperature. Selection of ballast IC (chip) that can run under these frequency conditions with high power requirements is nearly impossible, due to their limitations on handling electrical stress. To overcome the electrical stress problem and make the IC run at higher power, higher frequency conditions, and an isolated high side gate transformer is employed in the circuit. This invention discusses about the gate drive isolation circuit along with the unique resonating conditions of the ballast circuit. This invention also discusses about adding waveform correction circuit to the ballast circuit in order to filter the noise and protect the circuit under harsh electrical conditions.

Accordingly, it is an object of the present invention to provide improved ballast circuits useful with an electrodeless induction fluorescent bulb.

This and further objects and advantages will be apparent to those skilled in the art in connection with the drawings and the detailed description of the invention set forth below.

BRIEF DESCRIPTION OF THE FIGURES

FIG. 10 illustrates a typical Q-curve for a conventional electronic-fluorescent lamp ballast while

FIG. 12 illustrates the high energy actually measured in the resonating tank of a conventional electrodeless-fluorescent lamp during startup at high temperatures while

FIG. 14 illustrates a Q-curve obtained by actual measurements of a circuit designed in accordance with the present invention while

DETAILED DESCRIPTION OF THE INVENTION

Figure 1:
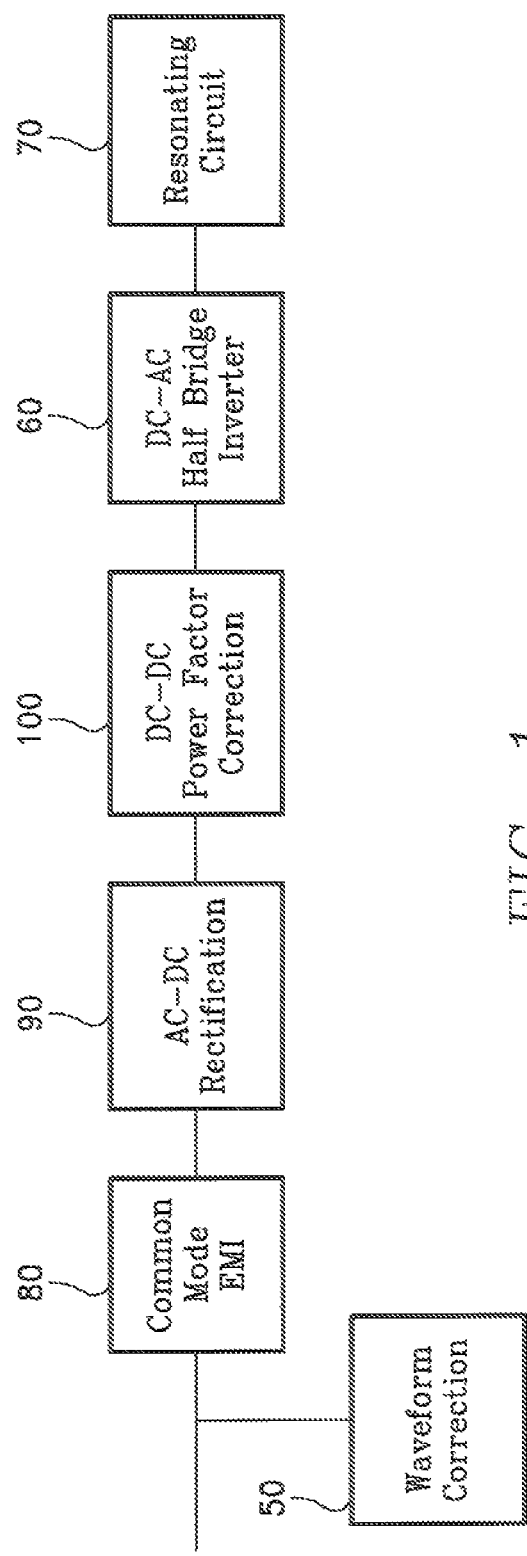
FIG. 1 is a block diagram of a ballast circuit for a lighting system using an induction fluorescent lamp according to the present invention.

FIG. 1 gives a block diagram of a ballast circuit useful in the present invention that includes AC-DC rectification using diode bridge 90, DC-DC boost power conversion along with power factor correction 100, DC-AC inversion using half bridge inverter circuit 60, and resonating circuit 70 to ignite the lamp and maintain the constant power output of the lamp. The ballast circuit is protected with common mode, differential mode filter 80 and also a waveform correction circuit 50 is added in parallel to the circuit for an added protection and performance.

Figure 2:
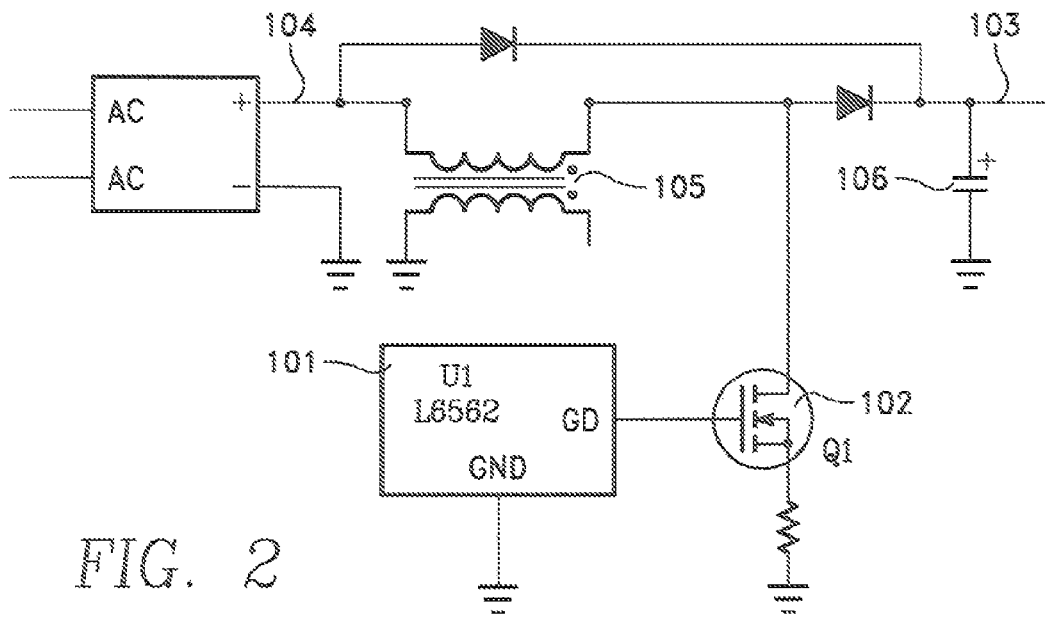
FIG. 2 is a schematic diagram of a DC-DC Power Factor Correction circuit that is represented by block 100 in FIG. 1.

FIG. 2 shows the DC-DC boost section of the ballast circuit of FIG. 1 along with active power factor correction. Integrated circuit STL6562 101 is used in transition mode operation, with a MOSFET 102 switch and boost inductor 105 in traditional boost topology, to achieve boosted DC at 103 from the rectified DC 104 with corrected power factor of 0.99 and low THD levels. Low loss boost inductor 105 is used in this boost topology. Electrolytic capacitor 106 is chosen such that it can handle maximum ripple current at maximum temperature conditions for longer life time.

Figure 3:
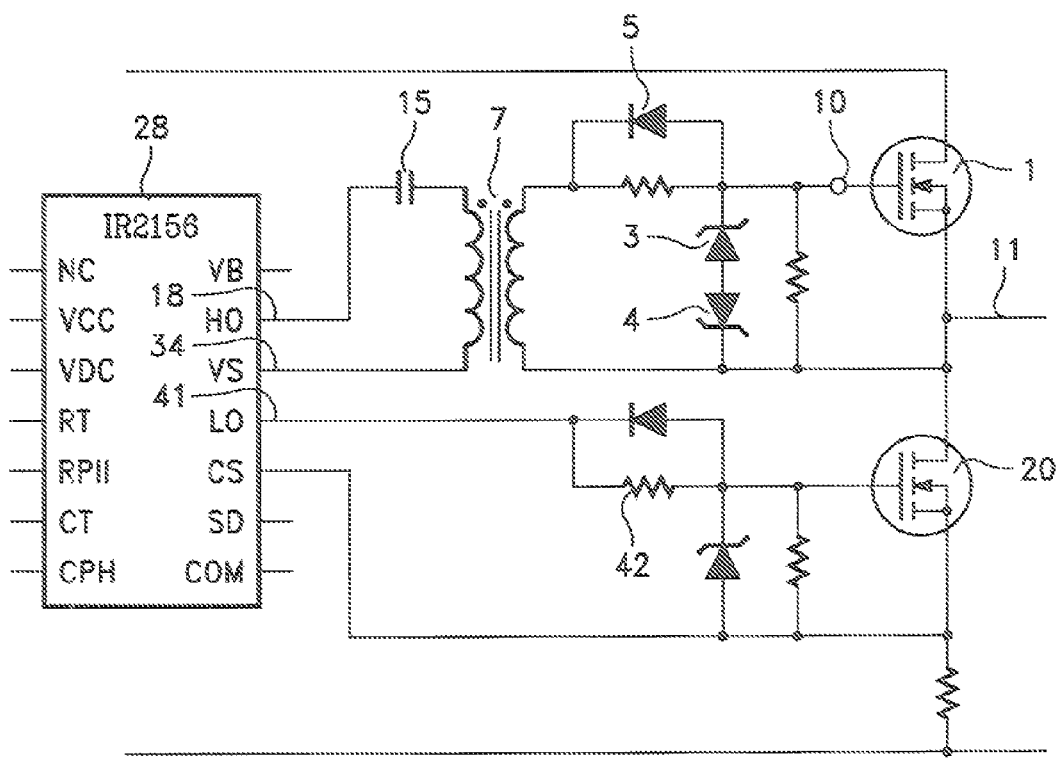
FIG. 3 is a schematic diagram of a DC-AC Half Bridge Inverter circuit that is represented by block 60 in FIG. 1.

FIG. 3 shows the DC-AC inverter section of the ballast circuit of FIG. 1 employs two MOSFET switches 1 and 20 in half bridge resonant inverter model. Integrated circuit IR2156 28 is used to drive the two MOSFETs 1 and 20 in the circuit. Gate isolation transformer 7 is used to isolate the high side gate, connected from HO pin 18 and Vs 34. Clamping zeners 3 and 4 are connected across MOSFET 1 to ensure the voltage at 10 doesn't exceed clamping voltage of zeners. Low side MOSFET 20 is connected from Lo 41, through bias resistor 42.

Figure 4:
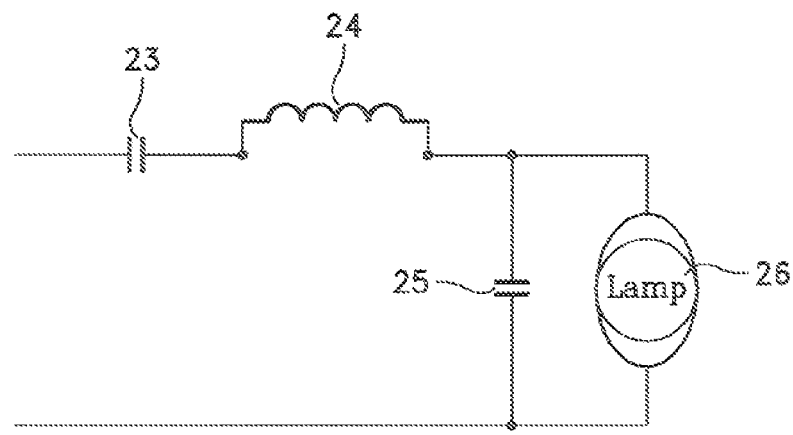
FIG. 4 is a schematic diagram of a Resonance Circuit that is represented by block 70 in FIG. 1.

FIG. 4 shows the resonant circuit of the ballast circuit of FIG. 1, which comprises blocking capacitor 23, resonating inductor 24, and resonating capacitor 25 along with electrodeless lamp 26.

Figure 5:
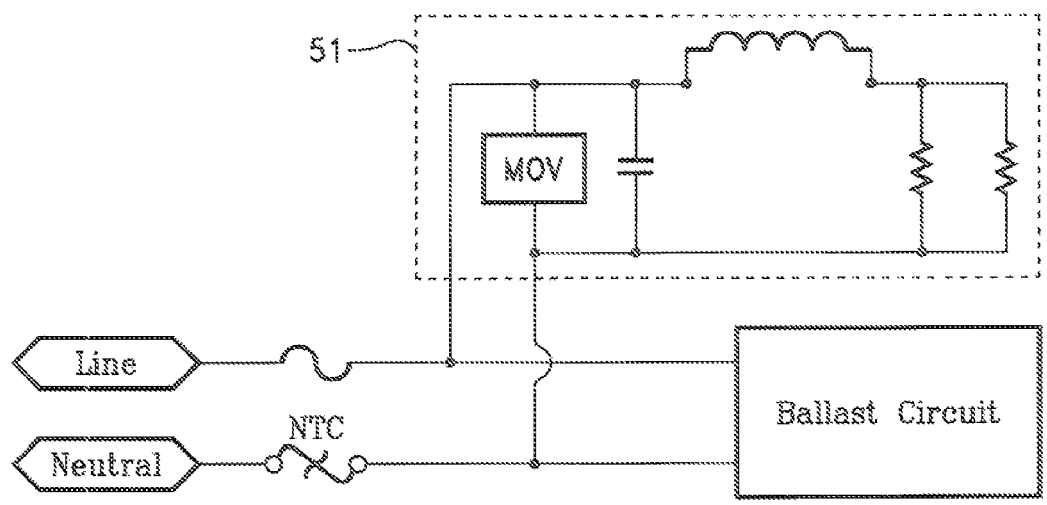
FIG. 5 illustrates a waveform correction filter such as is disclosed in U.S. Pat. No. 7,446,436 that is represented by block 50 in FIG. 1.

FIG. 5 shows waveform correction technology 51 added in parallel to the system.

The present invention mainly deals with the sections waveform correction 50, DC-AC half bridge inverter circuit 60 and resonating circuit 70 of the ballast circuit mentioned in FIG. 1.

Figure 6:
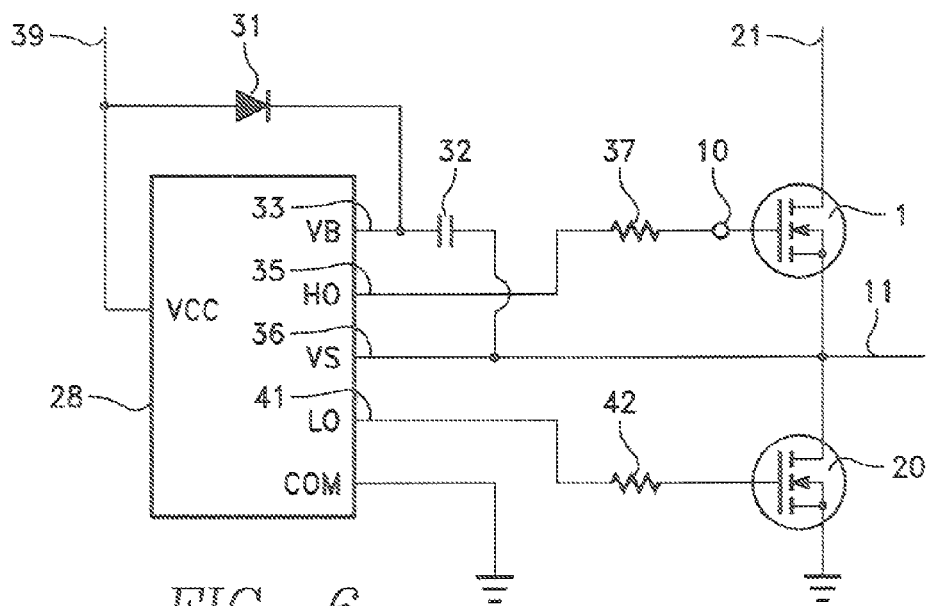
FIG. 6 illustrates a basic ballast IC circuit design for a typical lighting application.

Detailed Description of the DC-AC Inversion Circuit:

FIG. 6 illustrates a basic ballast IC circuit design for a typical lighting application. This circuit uses ballast IC 28 to drive high side MOSFET 1 and low side MOSFET 20, switching boosted DC from terminal 21. Based on the internal gate driving circuitry of the IC, the high side switches from terminals 33 and 34 and outputs the signal at 35. So, the signal is actually 35 referenced to 34, and is fed to gate 10 of high side MOSFET 1 through gate bias resistor 37. In order to turn on MOSFET 1, voltage at gate 10 needs to be greater than voltage at 11, and so pin 35 is always higher than pin 34. Low side MOSFET 20 receives its gate signal from low side drive output 41 of IC 28 through its bias resistor 42. When the IC is powered up, it generates the gate signal 41 for low side MOSFET 20, turning it on. At this point, the high side MOSFET 1 is still off, and the path of current is from regulated DC (used to power the IC) 39, boot diode 31, bootstrap capacitor 32 and then low side MOSFET 20. This way bootstrap capacitor 32 is charged to one diode dropped to regulated DC voltage value. IC then generates the high side signal 35, shutting down its low side signal 41. This high side signal is of amplitude at 33 (one diode dropped to regulated DC voltage) will turn on the high side MOSFET 1. Once both the switches 1 and 20 start oscillating, terminal 11 will see the boosted DC as high as 450 VDC. In this condition, in order to turn on high side MOSFET 1, the added bootstrap voltage from bootstrap capacitor (regulated DC 39—diode drop 31) to the 450 VDC will successfully turn on the high side MOSFET 1. This way of using the IC to drive the two MOSFETS in half bridge configuration is successful for most of the fluorescent lighting applications that run at less than 60 kHz.

However, the configuration of FIG. 6 is not realistic when dealing with higher frequency of operation along with higher wattage application. High energy or high voltage short duration transients resulting from the resonating tank in the ballast circuit at 11 may eventually be transferred to IC 28 through high side 37 or low side 42, adding switching transients from MOSFET 1 and 20 due to faulty signal, causing early life termination or permanent damage of IC 28. These typical ballast IC's are designed to withstand a maximum of 60 kHz for its preheat while induction lighting requires 466 kHz as preheat frequency. Therefore, these IC's are not suitable for higher frequency higher wattage application. However, there are no or limited resources for IC's that can operate under higher wattage higher frequency application and this leaves an engineer no choice other than using the existing technology to drive higher energy applications. Electrodeless lamps have a sweet spot of 250 kHz for resonance and 200 KHz as their operational frequency. The above IC's available in the market are not useful to drive the Electrodeless lamp application, unless some other additions to the circuit are made.

The present invention seeks to use most typical fluorescent ballast ICs to run high frequency, higher energy electrodeless lamps reliably and efficiently. As mentioned in the last paragraph, the main reason for the IC to be damaged is the massive energy transfer from the resonating tank to the IC's drive circuitry. In order to solve this problem, isolation of the gate signal is achieved. Although gate isolation can be implemented at both the high side and the low side of the bridge, it is especially desirable to isolate just the high side of the bridge because only the high side of the bridge carries higher energy and using one isolation circuit instead of two saves space and cost of PCB.

Implementation of High Side Gate Transformer:

In order to run the circuit at higher wattages and higher frequencies, the traditional ballast IC circuit needs further modifications, and an isolation gate transformer will alleviate some of the stress. The added advantage of this transformer is that it electrically isolates the MOSFETs from the control circuitry. Driver circuit 14 from FIG. 7 consists of coupling capacitor 15, 1:1 isolation transformer 7, diode 5, biasing resistor 6, clamping zener diodes 3 and 4, N-channel MOSFET 1, and pull down resistor 2.

Figure 7:
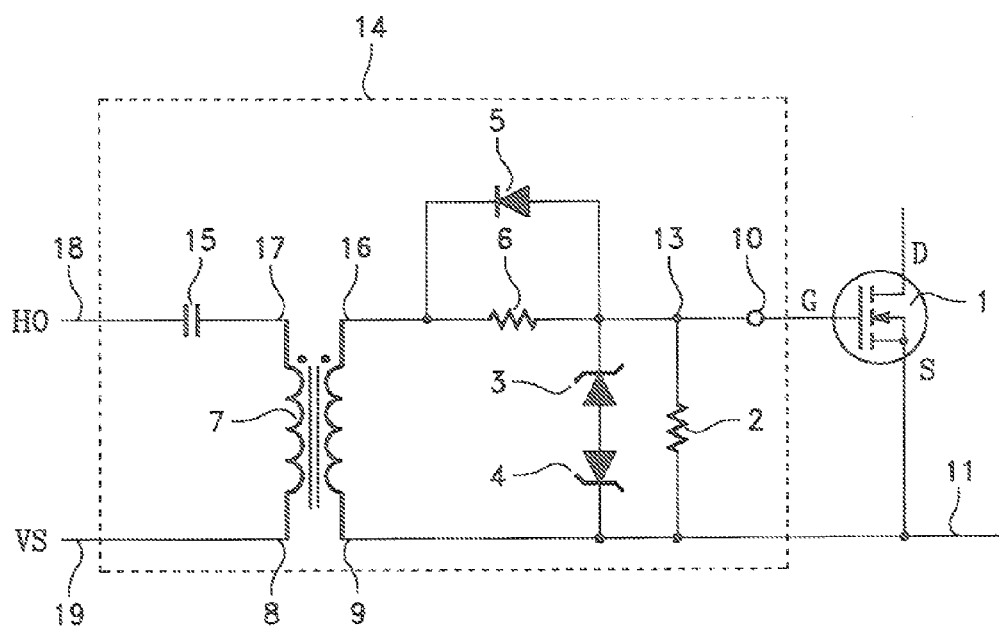
FIG. 7 is a schematic diagram of the high side driver circuit from FIG. 9.

FIG. 7 illustrates the high side driver circuit schematic useful in the present invention. Coupling capacitor 15 is placed in series between the HO signal 18 and the dotted side primary side of the transformer 17. The other end of primary side of the transformer 8 is connected to ground 19. Diode 5 is connected across gate resistor 6, connecting its anode to dotted secondary 16 of the transformer 7 and it's cathode to gate 10 of MOSFET 1 and/or anode of zener 3 and/or gate-source resistor 2. Resistor 2 is connected across gate 10 and source 11 of N-channel MOSFET 1. Resistor 2, cathode of zener 4 is connected to undotted end of secondary 9 transformer 7. Undotted end secondary side 9 of the transformer 7 is connected to the source 11 of the MOSFET 1.

Figure 8:
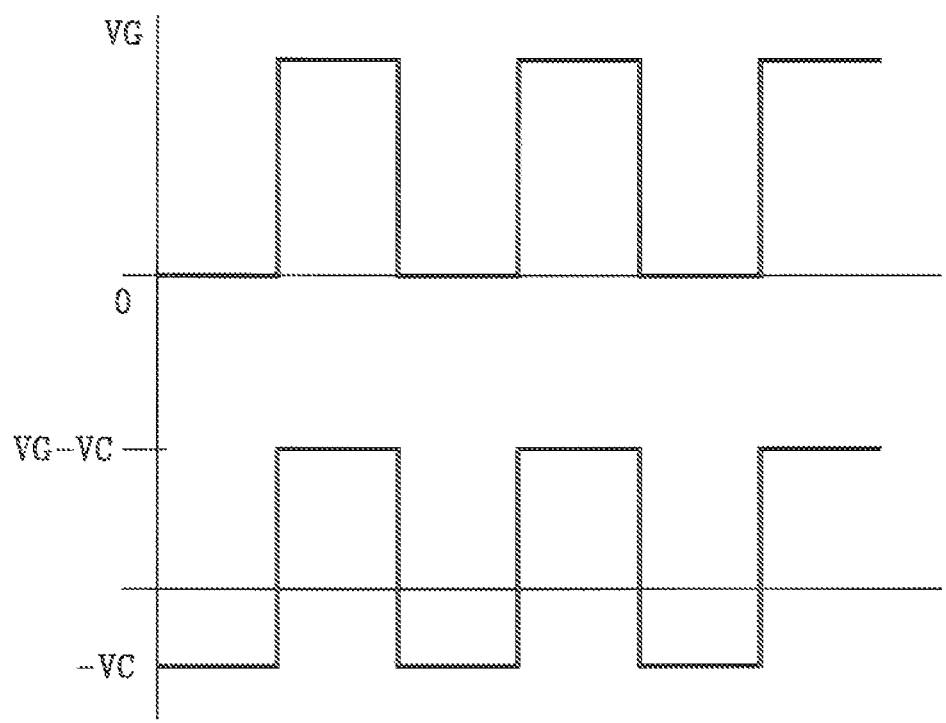
FIG. 8 is a waveform achieved from FIG. 7 in actual operation.

The winding ratio of transformer 7 is 1:1 and the input and output signals are in phase (observe the dots at 16 and 17). In an idealistic condition, a transformer doesn't store any energy. But, in reality, leakage inductance and magnetizing inductance in the transformer store a little energy and this causes low efficient transformer design that can affect the turn on and turn off timings of the gate signal. Therefore, it is very important to have the transformer designed with low leakage inductance. Gate driver outputs high side gate signal at 18 with respect to 19, with 19 being connected to digital ground. Coupling capacitor 15 is connected in series with the primary windings of the isolation transformer 7 in order to block any DC voltage while passing the AC portion of HO signal 18 to the dotted primary side of the transformer 17. Transformer 7 will saturate, if coupling capacitor 15 is not used in series with the windings, therefore coupling capacitor 15 resets the voltage for the magnetizing inductance. When the HO signal 18 is positive, it will induce positive voltage at dotted terminal 16 of transformer 7, bias gate resistor 6 allows the current flow to the gate 10 of N-channel MOSFET 1, bypassing diode 5. Diode 5 is a blocking diode during the positive voltage signal at 16, and the gate current only passes through gate resistor 6. When the gate signal goes to zero at 16, diode 5 helps to discharge the gate capacitance of the MOSFET 1 quickly, bypassing the gate resistor 6, pull down the gate 10 to source voltage 11, so that the MOSFET 1 is properly turned off efficiently and quickly. Bias gate resistor 6 is used to avoid any gate transient current from uncoupled inductance at 16 reaching MOSFET's 1 gate 10. Clamping zener diodes 3 and 4 are used to make sure that the gate voltage doesn't exceed the specified voltage range, clamping the voltage at 13 to rail to rail voltage of 16V. In other words, these two zeners 3 and 4 clip the negative and positive swing from the loosely coupled secondary inductance related transients. Pull down resistor 2 is used to dissipate voltage transients (dv/dt) caused by loosely coupled secondary inductance from secondary windings 16 and 9 of the transformer 7. During switching transitions uncoupled secondary inductance at 13 may create voltage spikes that can puncture MOSFETs gate's 10 oxide layer, thus permanently damaging the MOSFET 1. MOSFETs usually fail in short circuit mode and thus the two MOSFETs in half bridge may conduct at the same resulting in fuse and/or current sense resistor blow out. Therefore, it is essential to have the pull down resistor 2 between gate and source of the MOSFET, to protect the MOSFET from voltage transients. Coupling capacitor 15 provides AC coupling and thus the level shift for gate drive signal 18. After adding zeners 3 and 4 and coupling capacitor 15 from FIG. 7 at the high side MOSFET 1, gate 10 is now driven by $-V_C$ and $V_G-V_C$, as opposed to 0 and $V_G$, where $V_C$ is the voltage across coupling capacitor 15, and $V_G$ is the gate voltage. These waveforms are shown in FIG. 8. By doing so, the FET receives negative bias during its turn off time and hence it improves the turn off speed. It also improves the dv/dt immunity of the MOSFET. Pull down resistor 2 from FIG. 7 pulls the gate low during turn on, so that FET is always off at start up. Pull down resistor 2 helps the blocking capacitor to charge and discharge, otherwise voltage never builds up across blocking cap.

Temperature Dependency of the Circuit:

As mentioned above, electrodeless lamp systems are often installed at high bays and tunnels with very low air circulation and ventilation. Under these circumstances, the ballast system doesn't have very good thermal transfer outside the fixture, and they must therefore withstand high temperatures. The ambient temperature of the electrodeless lamp system under these conditions may go up to 180° F., causing the ballast components to run at above 200° F. Component values under these extreme high temperatures vary quite a bit, altering the circuit operating conditions. As the values of these components change, resonating conditions of the circuit also changes, shifting the resonance frequency higher or lower than designed. However, the IC is designed to drive the FETs at preprogrammed dead time and frequency, and any variance in the resonating frequency might not ignite the lamp. As the lamp is not ignited, the ballast IC keep trying to restrike the lamp resetting its values, a lot of energy might flow in the resonating circuit. There is a chance that this energy will take the path of the high side MOSFET to the ballast IC, damaging the internal driver circuit of the IC. The gate driver isolation will prevent this cause of the damage to the IC, electrically isolating the gate signal to the control signal.

Therefore, the gate isolation transformer is used in the ballast circuit to enhance the MOSFET control mechanism, protect the MOSFET from voltage transients, isolate the control circuitry from noise, alleviate the electrical stress on IC's internal driver circuit, and reduce switching losses at MOSFET.

Figure 9:
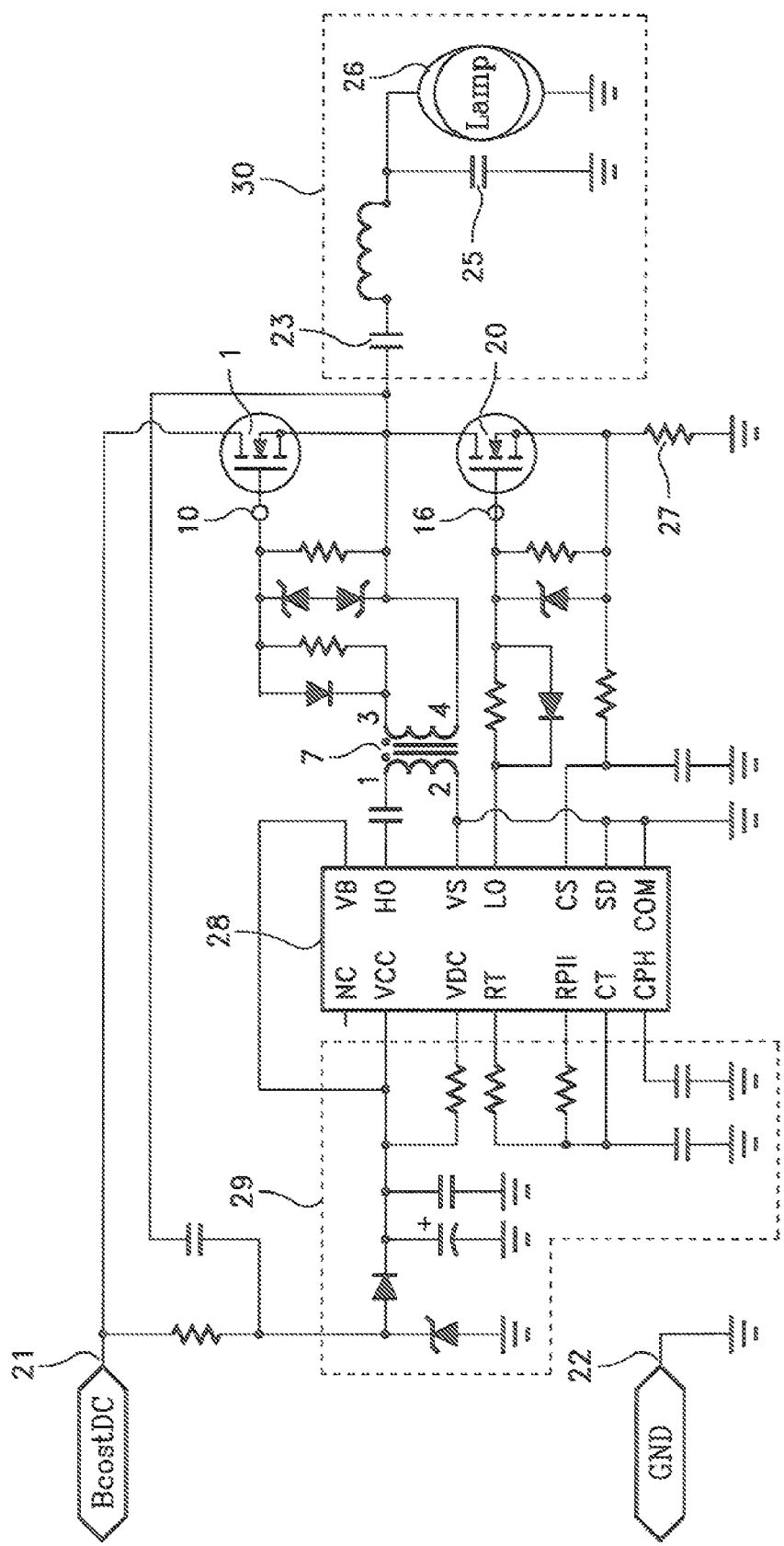
FIG. 9 is a schematic diagram of block 60 in FIG. 1 in greater detail than set forth in FIG. 3.

Resonating Circuit 70:

From FIG. 9, MOSFETs 1 and 20 are connected in a totem pole, half bridge configuration circuit and driven from high side and low side gate signals from IC 28. Control circuit 29 determines the dead time, switching frequencies of the IC 28. MOSFETs switch the boosted DC at terminals 21 and 22. The resonating tank from FIG. 4 consists of DC blocking capacitor 23, resonating inductor 24 and resonating capacitor 25. Electrodeless fluorescent lamp 26 is connected in parallel with the resonating capacitor 25. MOSFET 20 is connected to ground through current sensing resistor 27. Current sense resistor 27 limits the current that is being driven in the resonating tank 30. The value of resonating capacitor 25 is smaller than DC blocking capacitor 23, so that lamp 26 gets the higher AC voltage during its initial strike. Lower capacitor 25 will always have higher voltage compared DC blocking capacitor 23. Once lamp 26 strikes, the lamp will have less impedance compared to resonating capacitor 25 and hence the resonance capacitor behaves like an open circuit, making capacitor 23 and inductor 24 alone in the resonating tank 30. This will change resonating conditions in the tank, resulting in change of frequency for operation and change of voltage.

Electrodeless lamps do not have any electrode or filament in them, so they don't require preheat conditions, meaning electrodeless lamps do not require time to preheat and preheat current. The ballast IC has programmable preheat time, and preheat frequency, ballast is made to operate very short duration of time 140 mS for preheat with preheat frequency of 466 kHz. Before the lamp is ignited, the series L-C circuit will be in resonance with high Q factor. Once the preheat mode is passed, the frequency is swept (decreased) towards the resonance and the lamp voltage increases up to 1-1.5 kV to ignite the lamp. Once this high voltage ignites the lamp, the circuit then becomes a series L and parallel R C with low Q factor. After ignition, the frequency in the circuit is further decreased to running frequency of the lamp, and the lamp current is maintained at constant value at its running frequency.

Figure 10:
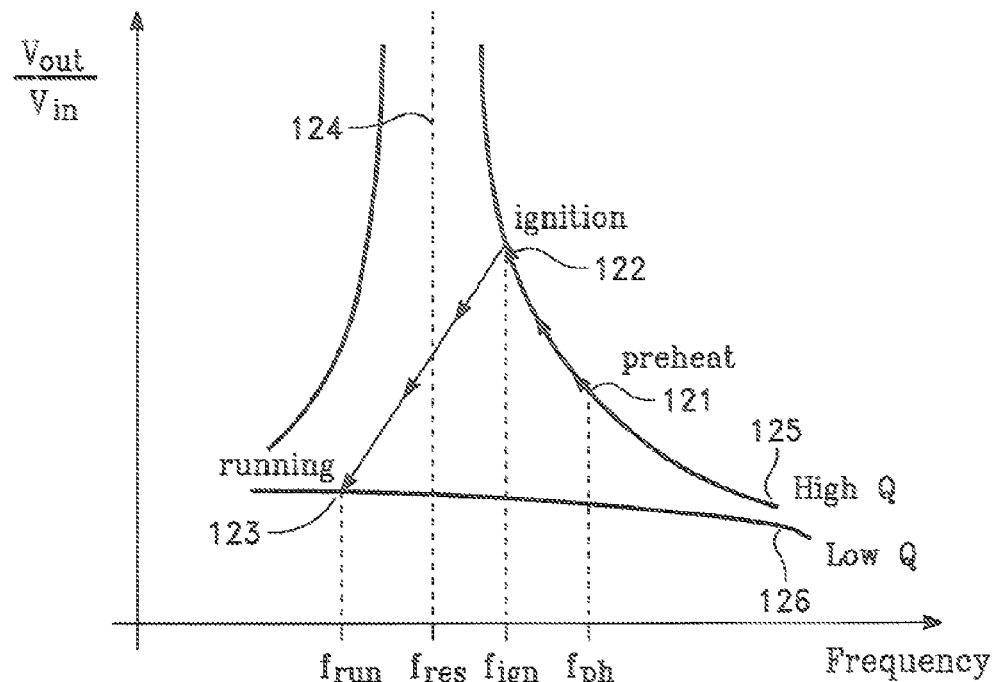
Figure 11:
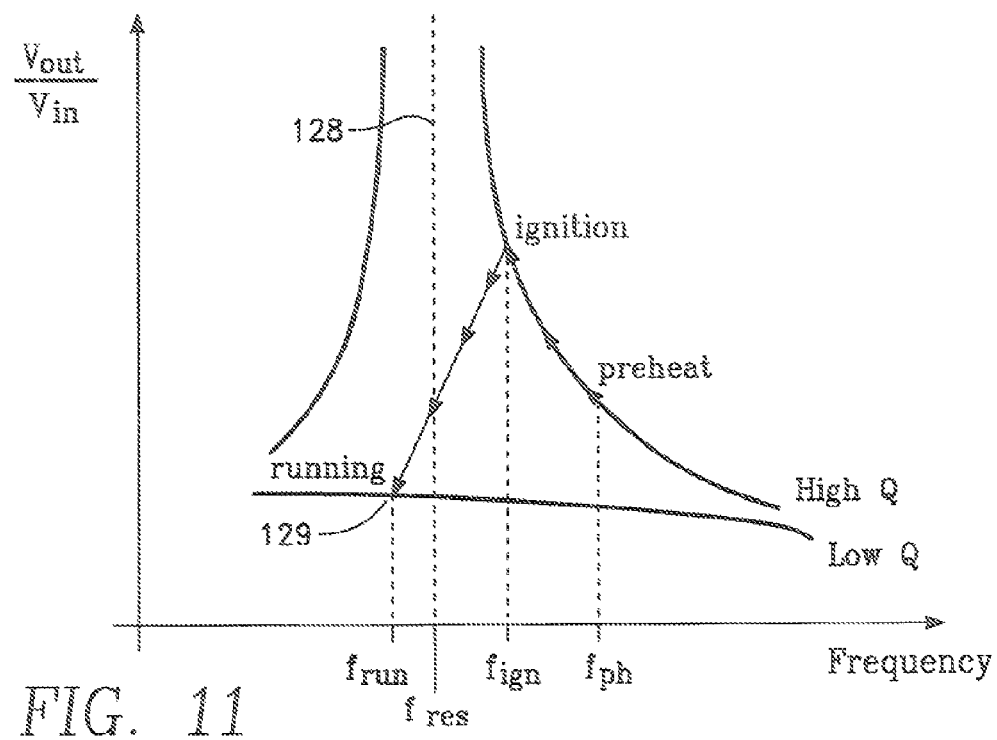
FIG. 11 illustrates how high temperatures shift operating points on the Q-curve of FIG. 10.

The present invention addresses preheat frequency, preheat time and resonating conditions of the ballast circuit. The values of the circuit parameters should be chosen in such a way that the ballast strikes the lamp successfully at all temperature conditions irrespective of the variance in its component values. Electrodeless lamps are usually run at 235 kHz with a preheat frequency and resonating frequency of 450 kHz and 240 kHz respectively. FIG. 10 shows the typical Q-curve for an electronic-fluorescent lamp ballast. In this figure, the ballast initially follows the high Q characteristics 125 of the resonating tank, and the ballast sweeps from preheat frequency 121 through Ignition frequency 122, where the ballast ignites the lamp. Once the lamp is ignited, the operating frequency of the circuit drops to running frequency 123, where the circuit maintains low Q value graph 126. The resonating conditions of the circuit are maintained at resonating frequency 124. In these typical characteristics of the resonating tank, there is significant difference between resonating frequency 124 and running frequency 123, say at least 30 kHz. However, due to the variance in the values of resonating inductor and lamp inductance under high temperatures, the difference between the resonating frequency and running frequency move further closer in less than 10 kHz range, and the Q-curve of the lamp system shifts as shown in FIG. 11. In this figure, the running frequency 129 of the ballast system is very close to the resonating frequency 128 of the tank, and the lamp runs close to resonance frequency. By the nature of resonance, the tank holds a lot of energy and maximum power transfer during resonating conditions, and hence the ballast will be dealing with excessive power and energy while it runs. This will stress the rest of the electrical components in the circuit and further cause damage to the ballast IC 28, causing permanent damage to the ballast. This is the main reason behind the failure of electronic ballasts in the field installation when they are subjected to high temperatures. Ballasts will mostly fail when they are power cycled at these high temperatures. This is a challenging design issue in electrodeless fluorescent ballast and it is reported that most of the ballast failures in the field installation are caused by this design error. The design error common in existing designs is that the frequencies chosen for the ballast are very close to each other.

Figure 12:
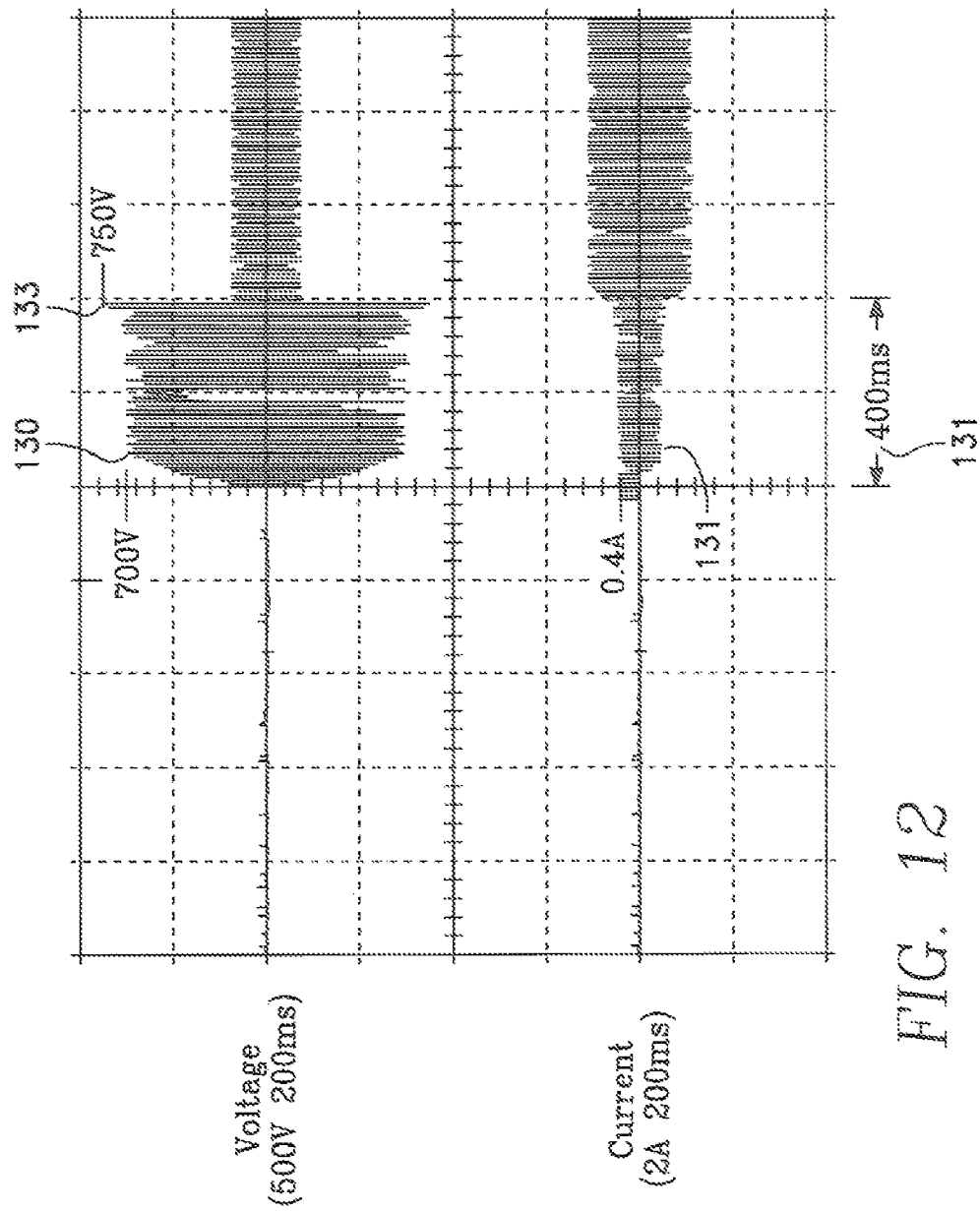
Figure 13A:
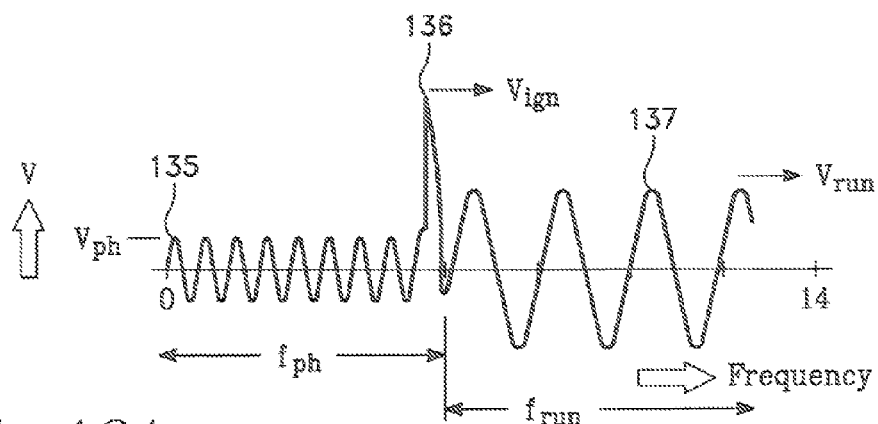
FIG. 13 illustrates how idealized ballast waveforms should look during startup at high temperatures.
Figure 13B:
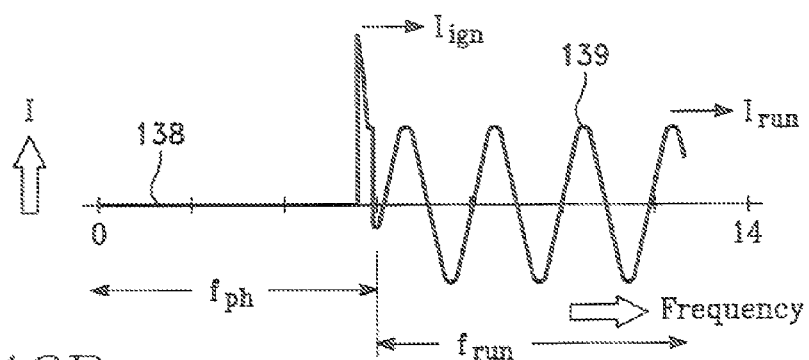

FIG. 12 shows the high energy in the resonating tank during startup at high temperatures. The preheat time for the ballast is approximately 400 ms 132, with a 750V ignition voltage 133 at 400 ms. The ballast maintains the preheat voltage of 700V 130 and 0.4 A 131 for 400 mS 132. This would calculate to 280 W of preheat energy in the resonating tank before even the lamp is ignited. It is seen that the ballast circuit is facing excessive energy while it tries to light the lamp. This is an excessive energy that doesn't need to be generated during ignition of the lamp. FIG. 13 shows the typical lamp characteristics during normal temperature conditions. Preheat voltage 135 should be less than the running voltage 137, and the preheat current 138 should be zero before the ignition voltage 136. Once the lamp is ignited 136, the values of running voltage 137 and running current 139 should be maintained constant and steady throughout the lamp operation. For an efficient and successful operation of ballast under high temperatures, the ballast waveforms should look like FIG. 13, but not like FIG. 12.

Figure 14:
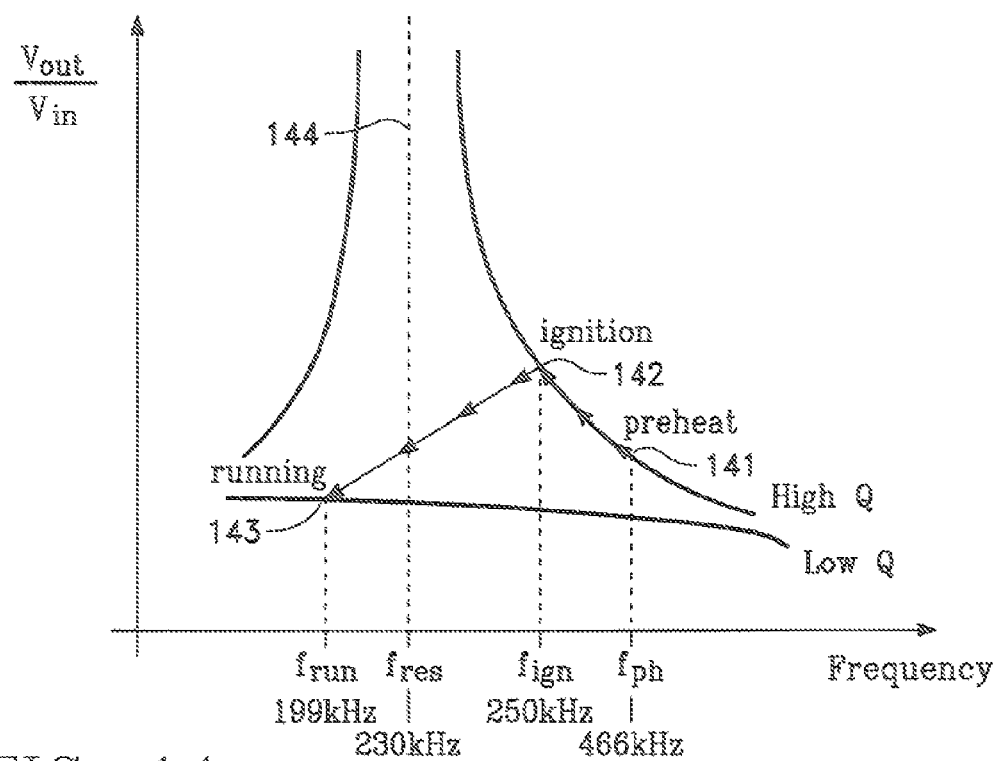
Figure 15:
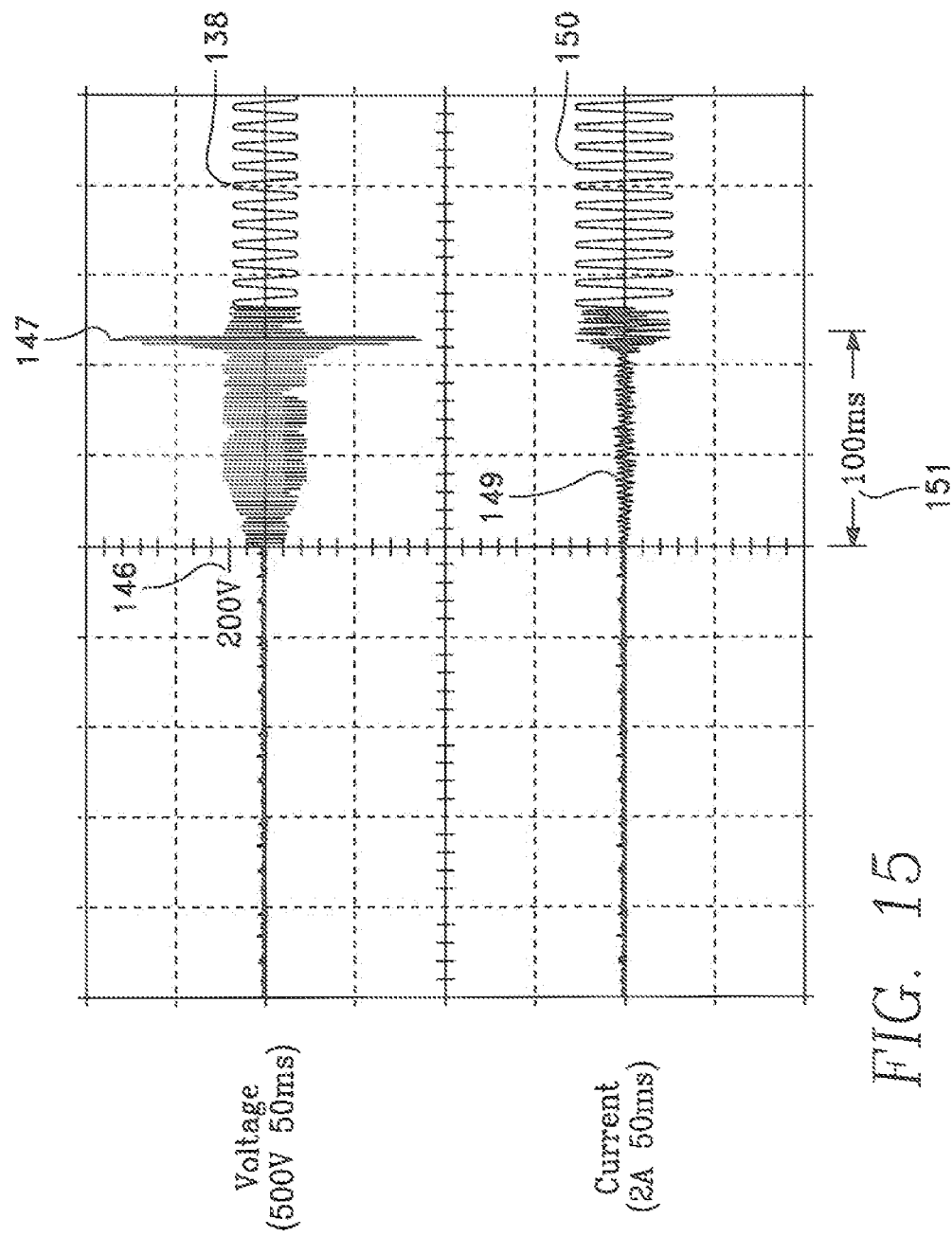
FIG. 15 illustrates actual waveforms of the same circuit obtainer during startup at high temperatures.

In the present invention, the values of resonating inductor and capacitor are chosen in such a way that the Q-curve doesn't shift a lot for any temperature variances. The values of resonant tank are chosen taking into account of variance in inductor, capacitor and lamp inductance values with respect to temperature changes. Variance in the lamp inductance also occurs due to the different manufacturing techniques adopted by lamp manufacturers. Therefore it is very important to design a resonating tank that can light the lamp at all possible conditions. IC 28, blocking capacitor 23, resonating inductor 24, resonating capacitor 25, and the lamp's inductance 26 from FIG. 9 were extensively studied under different temperature conditions, with varying operating and preheat frequencies, and the best possible combination of operating points are drawn in FIG. 14. From FIG. 14, the values of preheat 141, resonance 144, and running frequency 143 of the ballast have been chosen to be 466 kHz, 231 kHz and 199 kHz. These values are tested to be lighting the lamp at high temperatures successfully, and maintaining the constant lamp lumen output throughout its operation. The running frequency 143 is chosen such a way that it's not close to the resonance frequency 144 and of parametric variance will not lead the ballast to run at resonating frequency under any conditions. Therefore, the ballast avoids massive energy and/or power transfers while it runs. This change of Q-curve will cause less stress to the rest of the ballast components, and hence will last longer with optimum performance. This new set of values will also help the ballast to restrike successfully at extreme temperature conditions. FIG. 15 shows the successful lamp strike at high temperatures. From this figure, it is seen that the resonating tank doesn't hold any energy while it ignites the lamp. The value of preheat voltage 146 is 200V while the preheat current 149 is negligible during the preheat time of 110 mS 151. The lamp has an ideal ignition voltage of 900V 147, and after ignition voltage 148 and current 150 are steady and constant throughout the operation of the lamp and therefore the lamp output is constant. FIG. 15 is measured at higher temperature conditions and it is observed that the operating conditions of the ballast are very close to the idealistic conditions of the ballast from FIG. 13. The ballast is tested for its accuracy and robustness for restrike at the higher temperatures as well. Ballast was kept at ambient temperature of 85° C. and went through 34,000 power cycles. Ambient operating temperature of 85° C., caused all the electrical components in the ballast circuit to exceed their maximum temperature limits, however the ballast is observed to be power cycled 34,000 times successfully with low THD and high power factor. Therefore, use of high side gate isolation transformer, optimized tank circuit values and the frequency of operation are three important parameters for the successful efficient operation of electrodeless induction ballast at all operating temperatures.

Waveform Correction Circuit:

The last part of this invention deals with waveform correction & TVSS protection 50 of FIG. 1. This inventions introduces waveform correction technology to the ballast technology to maintain good power quality, along with added protection feature. Electrodeless ballast are operating under radio frequency range (up to 466 kHz during preheat, and 199 KHz run frequency), and a traditional differential and common mode filter may not be adequate to remove the noise generated from the ballast circuit. Heavy ballasts installation locations including freeways and tunnels will require further filtration, such that the noise generated from the ballast will not affect the sensitive electronic equipment such as traffic controllers, surveillance cameras, communication networking system. Sensitive electronic equipment such as traffic control system, smart lighting control, communication system, and IP cameras are highly susceptible to frequency noise generated by nonlinear loads such as lighting panels. Frequency noise in the range of 1.5 kHz to 1 MHz needs to be filtered from the load panels before they cause malfunction or erratic behavior of the sensitive computerized loads. Ballast circuits also need to be protected from internal/external generated electrical noise when installed in the field. Therefore, the ballast needs a filtration circuit along with a protection circuit for its successful operation in the field. Conducted or radiated energy transfer due to the electronic ballast on to the main line needs to be filtered, processed and protected. Waveform correction technology mentioned in U.S. Pat. No. 6,486,570B1 has been used and implemented in the ballast circuit as shown in FIG. 5.

In summary, and without meant to be limiting or exhaustive, the present invention discloses the following concepts and ideas:

1. From FIG. 9, high side gate isolation transformer 7 should be connected in half bridge inverter schematic, in the application of electrodeless induction ballast for the purpose of reducing electrical stress on typical ballast IC's 28 internal driver circuit, so that ballast IC 28 can run at higher frequencies (466 kHz) than its specification of 60 kHz.

2. From FIG. 9, high side gate isolation transformer 7 should be connected in half bridge inverter schematic, in the application of electrodeless induction ballast for the purpose of isolating and protecting the high side MOSFET's gate 1, and hence the MOSFET 10 in the event of operating ballast at higher frequencies and higher temperatures.

3. From FIG. 9, high side gate isolation transformer 7 should be connected in half bridge inverter schematic, in the application of electrodeless induction ballast for the purpose of protecting the ballast IC 28, in the event of operating ballast at higher frequencies and higher temperatures.

4. From FIG. 14, the Q-curve of the electrodeless induction lamp-ballast system should be shifted such a way that the difference between resonance and running frequency is much higher (at least greater than 30 kHz) when the ballast is under high ambient operating temperature conditions. This would decrease the preheat energy in the resonating tank, and hence successful restrike of the lamp at higher temperatures.

5. The resonating circuit values, operating frequency for the ballast IC should be chosen taking into temperature dependence on parameter values at 85° C.

6. From FIG. 14, preheat, resonance and running frequency of electrodeless induction lamp is chosen at 466±5 kHz, 231±5 kHz and 199±5 kHz respectively. These values are chosen after careful research of temperature dependence on component values in the circuit.

7. The waveform correction circuit mentioned in U.S. Pat. No. 6,486,570B1 is added to the ballast filtering circuit in order to remove electrical noise generated from ballast to the line.

8. The waveform correction circuit mentioned in U.S. Pat. No. 6,486,570B1, the disclosure of which is specifically incorporated herein in its entirety by reference, is added to the ballast to protect the ballast from internal/external transients from the facility.

While the invention has been described herein with reference to certain preferred embodiments, those embodiments have been presented by way of example only, and not to limit the scope of the invention. Additional embodiments thereof will be obvious to those skilled in the art having the benefit of this detailed description.

Accordingly, it will be apparent to those skilled in the art that still further changes and modifications in the actual concepts described herein can readily be made without departing from the spirit and scope of the disclosed inventions.

What is claimed is:

1. A ballast circuit for a lighting system using an induction fluorescent lamp, comprising:
   an AC-DC rectification circuit;
   a DC-DC boost power conversion circuit;
   a DC-AC half bridge inverter circuit; and
   a resonating circuit to ignite the lamp and maintain substantially constant power output of the lamp;
   wherein the DC-AC half bridge inverter circuit is further comprised of a gate isolation transformer connected in a half bridge inverter schematic which uses a ballast integrated circuit (IC) to drive a high side MOSFET and a low side MOSFET;
   wherein the gate isolation transformer electrically isolates a gate signal to the high side MOSFET; and
   wherein the gate isolation transformer is part of a driver circuit comprising:
      a coupling capacitor placed in series behind a high output signal and a first primary side of the isolation gate transformer; and
      a diode connected across a gate resistor, wherein an anode of the diode is connected to a first secondary side of the isolation gate transformer and a cathode of the diode is connected to at least one of the following:
         a zener diode connected across a gate and a source of the high side MOSFET, the gate of the high side MOSFET and a gate-source resistor connected across the gate and the source of the high side MOSFET;
   wherein a second primary side of the isolation gate transformer is connected to a digital ground; and
   wherein a second secondary side of the isolation gate transformer is connected to the source of the high side MOSFET.

2. The ballast circuit of claim 1, wherein the ballast circuit is protected with a common mode, differential mode filter and a waveform correction circuit is added in parallel.

3. The ballast circuit of claim 1, wherein a winding ratio of the gate isolation transformer is 1:1, input and output signals of the gate isolation transformer are in phase and the coupling capacitor is connected in series with primary windings of the gate isolation transformer.

4. The ballast circuit of claim 1, wherein a pair of zener diodes is connected across the gate and the source of the high side MOSFET to make sure that the gate voltage of the high side MOSFET does not exceed a specified negative voltage or a specified positive voltage.

5. The ballast circuit of claim 1, wherein the resonating circuit comprises a resonating inductor in series between a DC blocking capacitor and a resonating capacitor connected in parallel with the induction fluorescent lamp and the value of the resonating capacitor is smaller than the DC blocking capacitor.

6. The ballast circuit of claim 5, wherein the induction fluorescent lamp has a running frequency of 199±5 kHz with a preheat frequency of 466±5 kHz and a resonating frequency of 231±5 kHz.

7. The ballast circuit of claim 6, wherein the ballast circuit is protected with a common mode, differential mode filter and a waveform correction circuit is added in parallel.

8. The ballast circuit of claim 5, wherein a Q-curve of the induction fluorescent lamp is shifted such a way that the difference between a resonance frequency and a running frequency is 30 kHz or greater when the ballast circuit is operating at 85° C.

9. A ballast circuit for a lighting system using an induction fluorescent lamp, comprising:
   an AC-DC rectification circuit;
   a DC-DC boost power conversion circuit;
   a DC-AC half bridge inverter circuit; and
   a resonating circuit to ignite the lamp and maintain substantially constant power output of the lamp;
   wherein the DC-AC half bridge inverter circuit is further comprised of a gate isolation transformer connected in a half bridge inverter schematic which uses a ballast integrated circuit (IC) to drive a high side MOSFET and a low side MOSFET;
wherein the gate isolation transformer electrically isolates a gate signal to the high side MOSFET;
wherein the resonating circuit comprises a resonating inductor in series between a DC blocking capacitor and a resonating capacitor connected in parallel with the induction fluorescent lamp and the value of the resonating capacitor is smaller than the DC blocking capacitor; and
wherein a Q-curve of the induction fluorescent lamp is shifted such a way that the difference between a resonance frequency and a running frequency is 30 kHz or greater when the ballast circuit is operating at 85° C.

* * * * *